Jan 6, 1931.  E. K. INNES  1,787,683
FORK
Filed Feb. 8, 1929
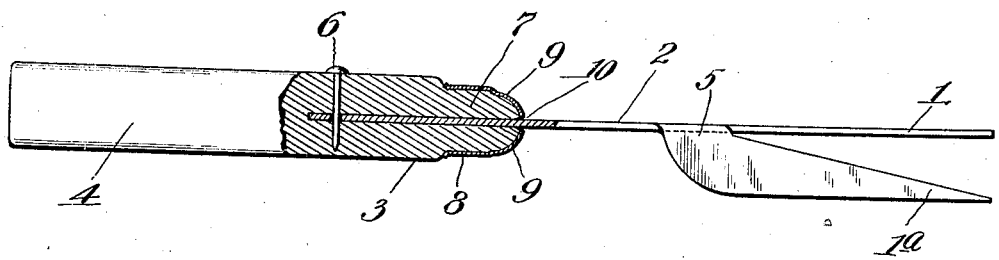
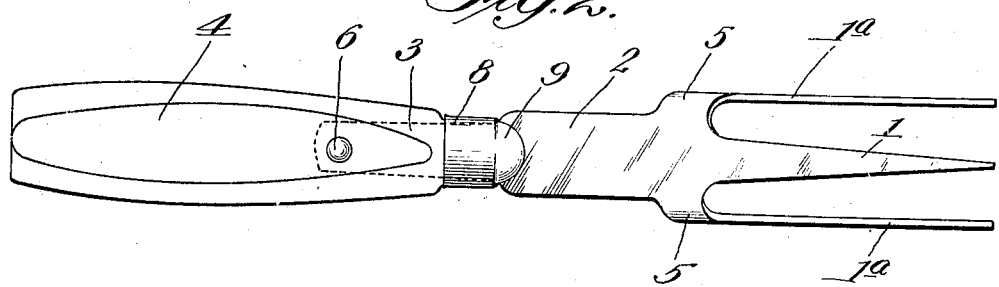
Inventor:
Edith K. Innes.
By Wallace G. Lane
Atty.

Patented Jan. 6, 1931

1,787,683

UNITED STATES PATENT OFFICE

EDITH K. INNES, OF ZION, ILLINOIS

FORK

Application filed February 8, 1929. Serial No. 338,377.

This invention relates to forks, and more in particular to a novel construction of fork or means of holding a pineapple or other fruit while the same is being shredded, cut, peeled, or prepared in any other manner.

Among the objects of my invention are to provide a novel construction of fork provided with a plurality of prongs or tines of substantially triangular shape; further to provide a novel construction of prongs or tines providing a simple and efficient means of holding the pineapple or other fruit or vegetable; further to provide a novel construction of maximum simplicity, efficiency, economy and ease of operation; and such further objects, advantages and capabilities as will later more fully appear.

My invention further resides in the combination, construction and arrangement of parts illustrated in the accompanying drawings, and while I have shown therein a preferred embodiment, I desire it to be understood that the same is susceptible of modification and change without departing from the spirit of my invention.

In the drawings:

Fig. 1 is a view in side elevation of my novel construction of fork, a portion thereof being broken away to more clearly disclose the attachment of the shank and tines to the handle, and Fig. 2 is a top plan view thereof.

Referring now more in particular to the drawings, my novel construction of fork comprises a plurality of prongs or tines 1 and 1ª, and having a shank portion 2 provided with a reduced end 3 adapted to seat in a handle 4 of any suitable construction and configuration. As shown in the drawings, I provide three tines or prongs of substantially triangular construction and shape, the central tine 1 being parallel to the shank member 2, while the outer tines 1ª are offset and provided with downwardly bent and forwardly extending portions 5, these tines being formed at right angles to the central tine and shank, and the lower surfaces thereof being substantially parallel to the central tine and shank. The tines are pointed and are rather wide at their base so as to define a relatively broad bearing surface for holding fruits, vegetables and the like.

The reduced end 3 of the shank is provided with an opening through which a pin or other fastening means 6 is adapted to be passed, the pin being driven through the handle member and through this opening, and thus securing together the members comprising the fork structure. The handle 4 is provided with a reduced portion 7, over which is fitted a sleeve or thimble 8 having lips 9 and an opening 10, through which the shank passes. These details allow for a rather simple construction which can be easily assembled, and when assembled, is very rugged.

My novel construction of fork is admirably adapted for holding a pineapple or other fruit or vegetable, while the same is being shredded, cut or sliced, or otherwise prepared for consumption, although it will be clear from the disclosure that I have provided a simple and efficient structure which is admirably adapted not only for the above enumerated uses, but also for any use to which a fork or other holding means may be put.

Having thus disclosed my invention, I claim:

1. In a fork construction, a shank therefor, a pair of downwardly bent and forwardly extending tines and a central tine on said shank, said pair of tines being offset from said central tine and each formed with a relatively wide base defining a broad bearing surface for holding fruits, vegetables and the like.

2. A fork comprising a handle member, a shank therefor, a pair of downwardly bent and forwardly extending tines and a central tine on said shank, said central tine being disposed in the same plane as said shank, and said pair of tines being offset from and disposed perpendicular to said shank and central tine, and each formed with a relatively wide base defining a broad bearing surface for holding fruits, vegetables and the like.

3. A fork comprising a handle member, a shank therefor, and a trio of triangular shaped tines on said shank, the outer of said tines being offset from and disposed at an angle to the intermediate tine and provided with a relatively broad base defining a wide bearing surface for holding fruits, vegetables and the like.

4. A fork comprising a handle member, a shank therefor, and a trio of triangular shaped tines on said shank, the outer of said tines being offset from and disposed at an angle to the intermediate tine and parallel to each other, and each tine provided with a relatively wide base defining a broad bearing surface for holding vegetables and the like, the lower edge of said outer tines being in a plane parallel to that of the intermediate tine.

In witness whereof, I hereunto subscribe my name to this specification.

EDITH K. INNES.